United States Patent
Uchida

(10) Patent No.: US 12,420,798 B2
(45) Date of Patent: Sep. 23, 2025

(54) CONTROL DEVICE FOR VEHICLE

(71) Applicant: TOYOTA JIDOSHA KABUSHIKI KAISHA, Toyota (JP)

(72) Inventor: Akito Uchida, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/986,943

(22) Filed: Dec. 19, 2024

(65) Prior Publication Data

US 2025/0256722 A1  Aug. 14, 2025

(30) Foreign Application Priority Data

Feb. 13, 2024 (JP) ................................ 2024-019707

(51) Int. Cl.
*B60W 30/182* (2020.01)
*B60W 10/115* (2012.01)
*B60W 20/15* (2016.01)

(52) U.S. Cl.
CPC ........ *B60W 30/182* (2013.01); *B60W 10/115* (2013.01); *B60W 20/15* (2016.01); *B60W 2510/0642* (2013.01); *B60W 2710/065* (2013.01)

(58) Field of Classification Search
CPC .. B60W 30/182; B60W 10/115; B60W 20/15; B60W 2510/0642; B60W 2710/065
See application file for complete search history.

(56) References Cited

U.S. PATENT DOCUMENTS

2013/0297161 A1\* 11/2013 Gibson .................. F16H 61/21
 180/65.265
2016/0325725 A1\* 11/2016 Yang ...................... B60K 6/442

FOREIGN PATENT DOCUMENTS

| | | | |
|---|---|---|---|
| JP | 2007071135 A | * | 3/2007 |
| JP | 2010-167827 A | | 8/2010 |
| JP | 2015-199382 A | | 11/2015 |
| WO | WO-2014120935 A2 | * | 8/2014 ............ B60W 10/06 |

\* cited by examiner

*Primary Examiner* — Justin Holmes
(74) *Attorney, Agent, or Firm* — Oliff PLC

(57) ABSTRACT

A control device, for a vehicle, include a determination unit configured to determine whether or not a traveling mode of the vehicle equipped with an engine as a traveling power source is switched to a circuit mode, and a switching unit configured to switch a target idle speed to a higher speed when the determination unit makes an affirmative determination than when the determination unit makes a negative determination.

2 Claims, 3 Drawing Sheets

CONTROL DEVICE FOR VEHICLE

CROSS-REFERENCE TO RELATED APPLICATION

This application is based upon and claims the benefit of priority of the prior Japanese Patent Application No. 2024-019707, filed on Feb. 13, 2024, the entire contents of which are incorporated herein by reference.

TECHNICAL FIELD

The present disclosure relates to a control device for a vehicle.

BACKGROUND

There is a vehicle that switches a traveling mode to a circuit mode (see, for example, Japanese Unexamined Patent Application Publication No. 2015-199382).

When the traveling mode is switched to the circuit mode, it is desirable to have a performance property to show the difference between the other modes and the circuit mode.

SUMMARY

It is therefore an object of the present disclosure to provide a control device for a vehicle that improves performance of a circuit mode.

The above object is achieved by a control device for a vehicle, including: a determination unit configured to determine whether or not a traveling mode of the vehicle equipped with an engine as a traveling power source is switched to a circuit mode; and a switching unit configured to switch a target idle speed to a higher speed when the determination unit makes an affirmative determination than when the determination unit makes a negative determination, the target idle speed being a target value of speed of the engine in an idle operation state.

When an automatic transmission of the vehicle is in any one of a D range and an R range, the switching unit may be configured to switch the target idle speed to a lower speed than when the automatic transmission is in any one of an N range and a P range, and the switching unit may be configured to switch the target idle speed to a lower speed when the automatic transmission is in the R range than when the automatic transmission is in the D range.

The control device may further include a gradual change process unit configured to control the engine so as to gradually change the speed of the engine toward the target idle speed, when the target idle speed is switched by the switching unit.

DETAILED DESCRIPTION

Schematic Configuration of Vehicle

Figure 1:
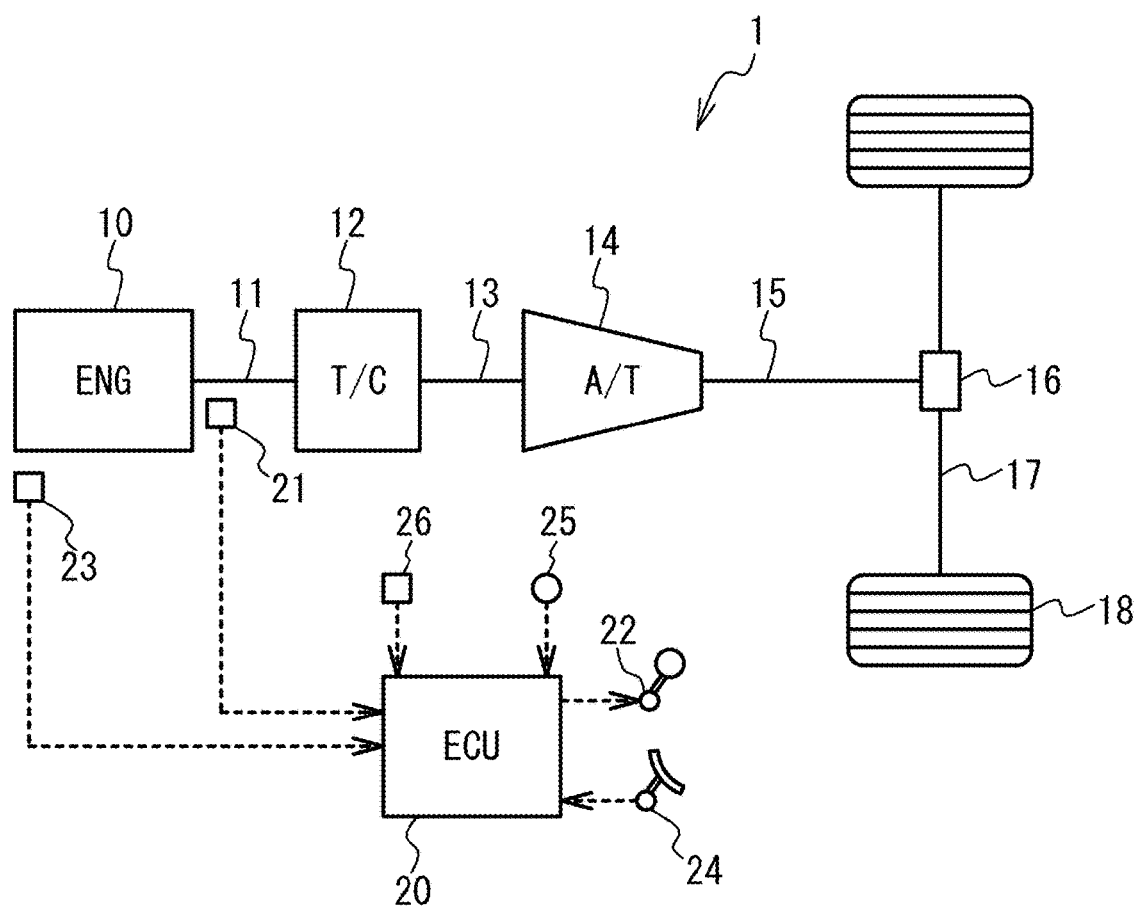
FIG. 1 is a schematic configuration view of a vehicle.

FIG. 1 is a schematic view illustrating a schematic configuration of a vehicle 1. The vehicle 1 includes an engine (ENG) 10, a torque converter (T/C) 12, and a stepped automatic transmission (A/T) 14. The engine 10 is a gasoline engine, but may be a diesel engine. The torque converter 12 is connected to a crankshaft 11 of the engine 10. A turbine shaft 13 of the torque converter 12 is connected to an input side of the automatic transmission 14, and the driving force of the engine 10 is transmitted to the automatic transmission 14. An output shaft 15 of the automatic transmission 14 is connected to a differential gear 16 that is a final reduction gear. The differential gear 16 is connected to left and right shafts 17. The driving force transmitted to the output shaft 15 is transmitted to driving wheels 18 via the shafts 17.

The automatic transmission 14 is a stepped transmission and includes a plurality of hydraulic friction engagement elements and a planetary gear device. In the automatic transmission 14, the automatic transmission 14 is switched to any one of a P (parking) range, an R (reverse) range, an N (neutral) range, and a D (drive) range by selectively engaging a plurality of friction engagement elements.

An Electronic Control Unit (ECU) 20 performs control processing related to the vehicle 1. The ECU 20 is a computer including a central processing unit (CPU), a random access memory (RAM), and a read only memory (ROM). The ECU 20 is an example of a control device of the car, and functionally achieves a determination unit, a switching unit, and a gradual change process unit, which will be described in detail later.

A crank angle sensor 21, a shift position sensor 22, an air flow meter 23, an accelerator opening sensor 24, a mode changeover switch 25, and a vehicle speed sensor 26 are connected to the ECU 20. Outputs from these sensors are input to the ECU 20. The crank angle sensor 21 detects the speed of the engine 10. The shift position sensor 22 detects whether the shift lever is in a P range position, an R range position, an N range position, or a D range position. The air flow meter 23 detects an intake air amount of the engine 10. The accelerator opening sensor 24 detects an accelerator opening degree that is an opening degree of an accelerator pedal. The mode changeover switch 25 switches a traveling mode to be described later. The vehicle speed sensor 26 detects a traveling speed of the vehicle 1.

The ECU 20 calculates a required torque and a target speed of the engine 10 based on the speed, the intake air amount of the engine 10, and the accelerator opening degree detected by the above-described sensors. The ECU 20 controls a fuel injection amount, an intake air amount, and an ignition timing in the engine 10 based on the required torque and the target speed. For example, when the engine 10 is in an idle operation state, the ECU 20 controls the fuel injection amount, the intake air amount, and the ignition timing so that the speed of the engine 10 becomes a target idle speed.

The ECU 20 can switch the traveling mode to any one of a normal mode, a sport mode, an eco mode, and a circuit mode. A driver switches the traveling mode to the normal mode, the sport mode, or the eco mode by operating the mode changeover switch 25. Regarding the circuit mode, for example, when the vehicle 1 is in a circuit site, the driver can operate a mobile terminal such as a smartphone to switch the traveling mode to the circuit mode. When the traveling mode is switched to the circuit mode, the control map of the vehicle 1 is switched to a control map in which priority is given to the traveling performance corresponding to the circuit mode. This improves the traveling performance of the vehicle 1 as compared with the traveling modes other than the circuit mode. The switching to the circuit mode may be performed by the mode changeover switch 25 as described above.

Performance Control

Figure 2:
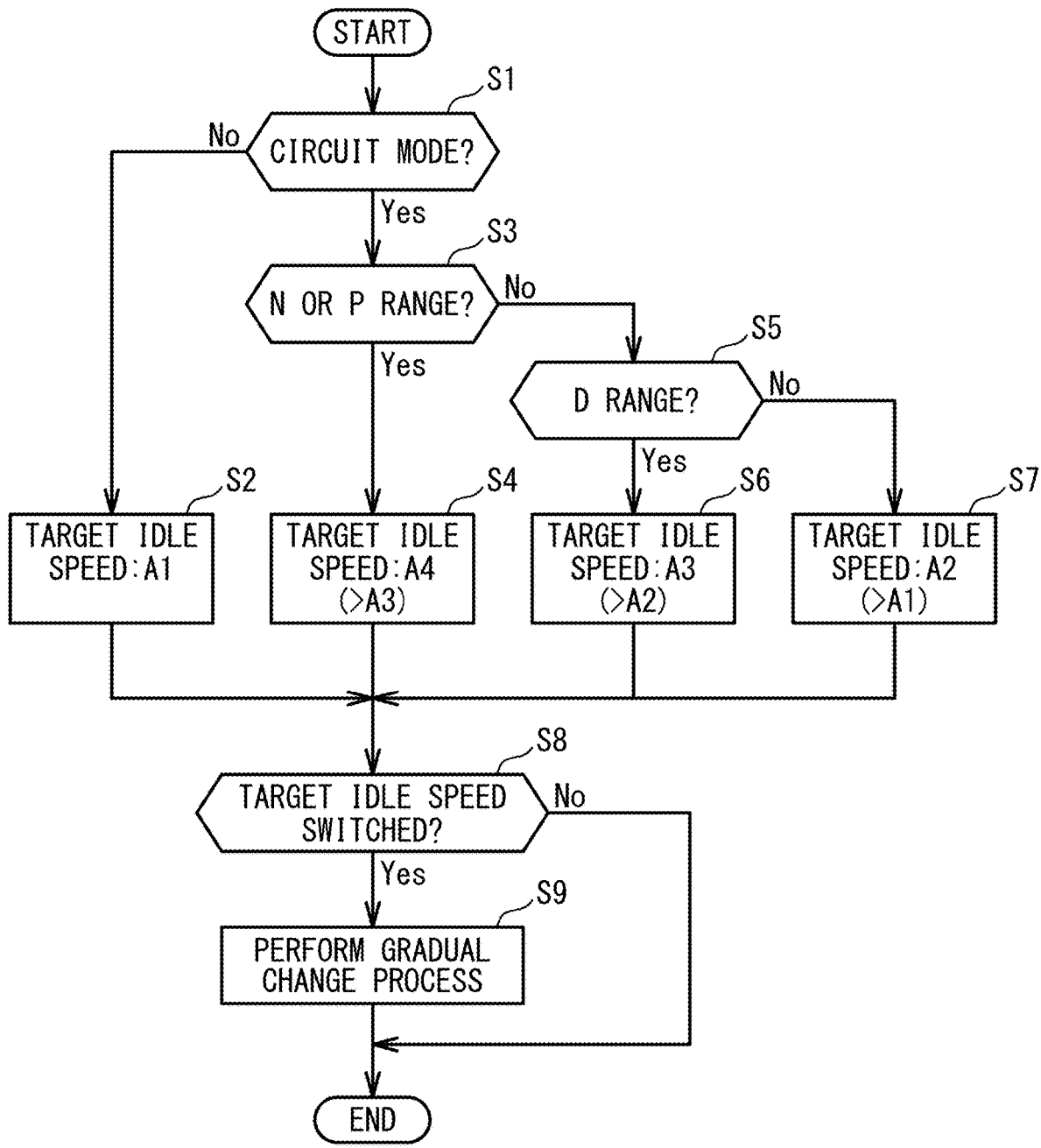
FIG. 2 is a flowchart illustrating an example of performance control.

FIG. 2 is a flowchart illustrating an example of performance control. This control is continuously repeated while the ignition is on. The ECU 20 determines whether the traveling mode is switched to the circuit mode or not (step S1). Step S1 is an example of a process executed by the determination unit.

If the determination result is No in step S1, the ECU 20 sets the target idle speed to a speed A1 (step S2). The speed A1 is a value lower than any of speeds A2 to A4 described later.

If the determination result is Yes in step S1, the ECU 20 determines whether the automatic transmission 14 is in any of the N range and the P range (step S3). If the determination result is Yes in step S3, the ECU 20 switches the target idle speed to the speed A4 (step S4). The speed A4 is a value higher than any of the speeds A1 to A3. Therefore, when the traveling mode is switched to the circuit mode, the driver notices that the idle speed of the engine 10 increases and easily recognizes the difference between the other traveling modes and the circuit mode. Thus, the performance of the circuit mode is improved. Step S4 is an example of a process executed by the switching unit.

If the determination result is No in step S3, the ECU 20 determines whether the automatic transmission 14 is in the D range or not (step S5). If the determination result is Yes in step S5, the ECU 20 switches the target idle speed to the speed A3 (step S6). The speed A3 is lower than the speed A4, higher than the speed A1, and higher than the speed A2. This prevents the vehicle speed from becoming too high during creeping. Since the speed A3 is higher than the speed A1, the performance of the circuit mode is improved also in this case. Step S6 is an example of a process executed by the switching unit.

If the determination result is No in step S5, the automatic transmission 14 is regarded as being in the R range, and the ECU 20 switches the target idle speed to the speed A2 (step S7). The speed A2 is lower than the speed A3, lower than the speed A4, and higher than the speed A1. This also prevents the vehicle speed from becoming too high during creep driving in reverse. Since the speed A2 is higher than the speed A1, the performance of the circuit mode is improved also in this case. Step S7 is an example of a process executed by the switching unit.

Next, the ECU 20 determines whether or not the target idle speed is switched, due to a change in the shift position or a switch in the traveling mode (step S8). If the determination result is No in step S8, the control ends. If the determination result is Yes in step S8, the ECU 20 performs the gradual change process (step S9). The gradual change process is a process of gradually changing the engine speed toward the switched target idle speed. Concretely, the ECU 20 gradually changes the fuel injection amount and the intake air amount toward the fuel injection amount and the intake air amount corresponding to the switched target idle speed. Thus, the engine speed is gradually changed toward the switched target idle speed. Step S9 is an example of a process executed by the gradual change process unit.

Figure 3:
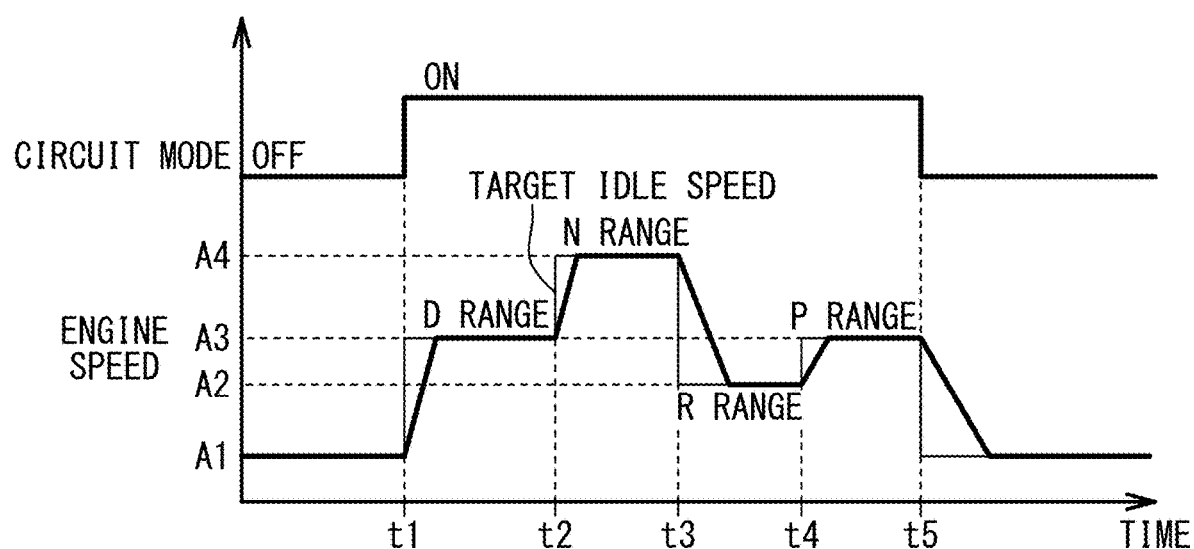
FIG. 3 is a timing chart illustrating a transition of an engine speed by the performance control.

FIG. 3 is a timing chart illustrating a transition of the engine speed in the performance control. When the automatic transmission 14 is in the D range and the traveling mode is switched to the circuit mode, the target idle speed is switched from the speed A1 to the speed A3 (time t1). The engine speed gradually increases from the speed A1 to the speed A3 by the gradual change process described above. When the automatic transmission 14 is switched from the D range to the N range, the target idle speed is switched from the speed A3 to the speed A4 (time t2). Further, the engine speed gradually increases toward the speed A4 by the gradual change process.

When the automatic transmission 14 is switched from the N range to the R range, the target idle speed is switched from the speed A4 to the speed A2 (time t3). Further, the engine speed is gradually decreased toward the speed A2 by the gradual change process. When the automatic transmission 14 is switched from the R range to the P range, the target idle speed is switched from the speed A2 to the speed A3 (time t4). The engine speed is gradually increased toward the speed A3 by the gradual change process. When the traveling mode is switched to a mode other than the circuit mode, the target idle speed is switched from the speed A3 to the speed A1 (time t5). Further, the engine speed is gradually decreased toward the speed A1 by the gradual change process.

As described above, the gradual change process prevents the engine speed from rapidly decreasing and the engine 10 from stalling, for example, when the target idle speed is switched to a low speed. Further, when the target idle speed is switched to a high speed, it is possible to avoid the engine speed from rapidly increasing and giving a sense of discomfort to the driver.

In the embodiment described above, the vehicle 1 including the automatic transmission 14 is described as an example, but the vehicle is not limited thereto. For example, the vehicle may be provided with a manual transmission. In this case, the target idle speed may be switched to a higher target idle speed in the circuit mode than in the mode other than the circuit mode, regardless of the range of the manual transmission. In the above embodiment, the target idle speed is set to be the same between the D range and the P range of the automatic transmission 14, but the present disclosure is not limited to this. For example, the target speed when the automatic transmission 14 is in the D range may be higher than the target idle speed when the automatic transmission 14 is in the P range.

In the embodiment described above, the vehicle 1 including the engine 10 as a traveling power source has been described as an example, but the vehicle is not limited thereto. For example, the vehicle may be a hybrid vehicle including an engine and a motor as traveling power sources.

Although some embodiments of the present disclosure have been described in detail, the present disclosure is not limited to the specific embodiments but may be varied or changed within the scope of the present disclosure as claimed.

What is claimed is:

1. A control device for a vehicle, comprising:
   a determination unit configured to determine whether or not a traveling mode of the vehicle equipped with an engine as a traveling power source is switched to a circuit mode; and
   a switching unit configured to switch a target idle speed to a higher speed when the determination unit makes an affirmative determination than when the determination unit makes a negative determination, the target idle speed being a target value of speed of the engine in an idle operation state, wherein
   when an automatic transmission of the vehicle is in any one of a D range and an R range, the switching unit is configured to switch the target idle speed to a lower speed than when the automatic transmission is in any one of an N range and a P range, and the switching unit is configured to switch the target idle speed to a lower speed when the automatic transmission is in the R range than when the automatic transmission is in the D range.

2. The control device for the vehicle according to claim 1, further comprising a gradual change process unit configured to control the engine so as to change the speed of the engine toward the target idle speed, when the target idle speed is switched by the switching unit.

* * * * *